Patented Apr. 25, 1944

2,347,402

UNITED STATES PATENT OFFICE 2,347,402

CALCIUM HYPOCHLORITE

George Gerald Day, Niagara Falls, N. Y., assignor to The Mathieson Alkali Works, Inc., New York, N. Y., a corporation of Virginia No Drawing. Application February 18, 1941, Serial No. 379,479

6 Claims. (Cl. 23—86)

This invention relates to the manufacture of granular calcium hypochloric products, the term "calcium hypochlorite" being employed to include undiluted calcium hypochlorite as well as other products in which calcium hypochlorite is accompanied by customary commercial impurities or diluents, such as hydrated lime, free lime, sodium chloride, calcium chloride, calcium chlorate, calcium carbonate, etc. Thus, the term is employed to include commercial calcium hypochlorite which ordinarily contains from 70% to 74% of calcium hypochlorite per se, the balance of the commercial compound being composed of diluents, such as sodium chloride, hydrated lime and calcium carbonate together with impurities. The invention contemplates improvements in the drying of calcium hypochlorite to the end that a new and superior product is obtained and numerous difficulties attendant upon prior drying practices are avoided.

In a heretofore customary practice of calcium hypochlorite manufacture, the calcium hypochlorite is obtained as a slurry containing crystals of calcium hypochlorite dihydrate $[Ca(OCl)_2.2H_2O]$ in a mother liquor consisting essentially of an aqueous solution of calcium hypochlorite and sodium chloride. The slurry is subjected to filtration on a rotary vacuum filter to produce a cake that retains sufficient mother liquor to have a moisture content of 45% to 50% by weight. If this cake is removed from the filter without disturbing its form and subsequently dried, a very light porous cake is obtained. This breaks down to an undesirable fine, dusty powder. If, on the other hand, the filter cake is re-pulped, it forms a thick slurry which dries very slowly, so that decomposition of the calcium hypochlorite is high. The cake resulting from drying of the re-pulped material is hard and difficult to grind and forms an unsatisfactory dusty product. Neither of the foregoing drying practices results in a suitable granular product.

Attempts have been made to produce a suitable dry calcium hypochlorite product by subjecting a slurry of calcium hypochlorite to filtration in specially constructed presses that apply pressures of several hundred pounds per square inch. Such practice gives a hard cake low in moisture content which may be cut up before drying but which does not yield a granular product upon drying. Moreover, the procedure is troublesome and generally uneconomical.

Other difficulties in the drying of calcium hypochlorite result from the tendency of the filter cake to stick to the surfaces of the drier and from the tendency of the fine dry material to dust.

I have discovered that most of the foregoing difficulties may be avoided and a superior granular calcium hypochlorite product manufactured by subjecting a plastic slurry of calcium hypochlorite simultaneously to evaporation and agitation until the unevaporated portion of the slurry forms a plurality of loosely bonded aggregates. Thus, I have discovered that if a plastic slurry of calcium hypochlorite is kept agitated during evaporation of the moisture content therefrom, a period is reached when the unevaporated portion breaks into a number of ball-like aggregates which further subdivide as evaporation and agitation are continued, thus forming a larger number of smaller balls and eventually a granular product. Generally speaking, the formation of the loosely bonded aggregates and the subdivision of these aggregates into a granular product takes place as the moisture content is reduced to a point ranging from about 25% to about 35% by weight.

The drying and simultaneous agitation may be stopped soon after the ball-like aggregates first form, but preferably this operation is continued until the balls have been much reduced in size and a finer granular condition attained. In either case, the agitation is interrupted before the moisture content has been reduced too far, say, below 25%. In this way there is obtained a novel product comprising loosely bonded ball-like aggregates of calcium hypochlorite containing moisture in proportions ranging from about 25% to about 35% by weight. This product is particularly adapted for drying with a minimum of decomposition to form a granular, substantially dustless, free-flowing calcium hypochlorite that has a high apparent density and that dissolves rapidly and readily in water.

The drying of the above-described product preferably takes place while the product is maintained in a relatively quiescent condition, i. e., with little or no agitation. Thus, drying may be completed by transferring the "balled-up" or granular product to a drier, such as a vacuum shelf dryer, in which the drying is conducted with little or no agitation until the moisture content is substantially removed, i. e., reduced to about 2% or less.

The ball-like or granular product resulting from the evaporation and agitation to the point where the moisture content is reduced to 25–35% by weight generally does not consist of particles that are of uniform size. This, however, causes no difficulty in the final drying for the over-size balls may be separated by screening and easily crushed to increase the yield of smaller granules in the final dry product. Preferably, screening out of the oversize aggregates and the crushing thereof to the desired size is conducted before the final drying.

The starting calcium hypochlorite material may be obtained in any convenient manner. Thus, the plastic slurry may be formed by removing water from a very fluent mass of calcium hypochlorite, or it may be obtained by adding liquid, say water, to a calcium hypochlorite mass that contains insufficient liquid to be plastic. In other words, the water content of the starting material may be adjusted (1) by removing liquid through filtration, settlement or evaporation, or (2) by the addition of liquid.

In short, the only requirement is that the moisture content of the slurry shall not be too greatly reduced prior to subjecting it to the simultaneous evaporation and agitation. If desired, the operation may be begun with a slurry which contains a great excess of water so that it does not become plastic until evaporation has progressed substantially, but, conveniently, the starting material is a filter cake from which excess liquid has been removed by filtration, centrifuging or the like.

The moisture content necessary to produce the plastic slurry will depend upon the nature and amount of the impurities or diluents present in the calcium hypochlorite. Generally speaking, it will be substantially greater than that of the balled-up partially dried material which may range from about 25% to about 35%.

The simultaneous drying and evaporation may be carried out in a variety of apparatus. The agitating equipment should be capable of handling a fairly stiff plastic mass. A double shaft sigma blade horizontal mixer is well adapted to the operation. Vacuum evaporation is preferable because it permits drying at a low temperature with a minimum of decomposition. Moreover, vacuum evaporation together with agitation brings about the removal of air or other gases which may be included in the slurry and brings about a compacting of the mass during drying which, in turn, favors formation of a granular product.

The moisture content of the granular or ball-like product produced by the simultaneous drying and evaporation will vary to some extent, depending upon the nature or quantity of the impurities or diluents present. Generally speaking, the best guide to the proper moisture content is the change in the condition of the material as drying progresses. Some material may give best results when dried down to 32% to 34% moisture in a mixer. If this same material is dried further in the mixer, to, say, 28–30% moisture, a granular product will still be obtained, but there will be a much larger percentage of fine material. The moisture content of this particular material might even be lowered to 25%, but under such circumstances a considerable proportion of the product would be too fine.

The presence of appreciable quantities of lime hydrate in the starting material requires that the moisture content in the mixer be reduced further than in those cases in which little or no lime hydrate is present. For example, calcium hypochlorite containing 10% lime hydrate may give best results when dried down to 29–30% moisture in the mixture. If more than 10% lime hydrate is present, the drying in the mixer usually should be continued until the moisture content is below 29%, although this may not be necessary in all cases, especially when the starting material was originally dry and has been made plastic by the addition of water.

Following the drying-agitation operation as described above, the calcium hypochlorite is in a firm granular form. Preferably, this material is transferred to a vacuum shelf dryer and dried without agitation until the moisture content is substantially removed. However, other types of driers in which there is no agitation, or at least no severe agitation, may be employed, provided that the drying is conducted at a relatively low temperature so as not to bring about excessive decomposition.

The invention will be more thoroughly understood in the light of the following examples of presently preferred practices.

*Example 1*

In this operation, the starting material was the cake from a rotary filter which had the following composition:

|  | Per cent |
|---|---|
| $Ca(OCl)_2$ | 45.43 |
| $Ca(ClO_3)_2$ | .02 |
| $CaCO_3$ | .44 |
| $Ca(OH)_2$ | .24 |
| $CaCl_2$ | .44 |
| $NaCl$ | 7.75 |
| $H_2O$ | 45.68 |

The cake was placed in a horizontal double shaft sigma blade mixer equipped with means for applying a vacuum to its interior and with a heating jacket. Vacuum was established in the mixer; the agitation was started and steam was admitted to the jacket at atmospheric pressure. Heating and agitation were continued for a period of about one hour with an absolute pressure inside the mixer of between 10 mm. and 30 mm. Hg. At the end of the hour, the material had attained a suitable granular condition and was removed from the mixer. This partially dried material had the following analysis:

|  | Per cent |
|---|---|
| $Ca(OCl)_2$ | 56.87 |
| $Ca(ClO_3)_2$ | .06 |
| $CaCO_3$ | .47 |
| $Ca(OH)_2$ | .33 |
| $CaCl_2$ | .39 |
| $NaCl$ | 10.00 |
| $H_2O$ | 31.88 |

The material from a mixer was dried in shallow pans in a vacuum shelf dryer for about eight hours. After this final drying, the material had the following analysis:

|  | Per cent |
|---|---|
| $Ca(OCl)_2$ | 74.44 |
| $Ca(ClO_3)_2$ | 1.49 |
| $CaCO_3$ | 1.51 |
| $Ca(OH)_2$ | 4.87 |
| $CaCl_2$ | .72 |
| $NaCl$ | 15.89 |
| $H_2O$ | 1.08 |

A screen analysis conducted upon the material from the pan dryer gave the following results:

|  | Per cent |
|---|---|
| +14 mesh | 57.3 |
| −14 +65 mesh | 34.9 |
| −65 mesh | 7.8 |

In this instance, a material ranging in size between 14 and 65 mesh was desired. The +14 mesh portion of the material was crushed with rolls to pass 14 mesh and after screening to remove −65 mesh material was mixed with the remainder. The material was substantially dustless and granular in character.

*Example II*

In this operation, the calcium hypochlorite product was formed in a laboratory mixer of the horizontal double shaft sigma blade type. Thus, 5.5 lbs. of hydrated lime were added slowly to 7 lbs. of water in the mixer, and after agitation 15.2 lbs. of tertiary butyl hypochlorite were added. Reaction in the mixer was allowed to continue until the hydrolysis of the ester, i. e., the butyl hypochlorite, was nearly complete. The mixer was then closed; vacuum was applied while steam was admitted to the jacket of the mixer. Tertiary butyl alcohol and water were first driven off and then additional water.

The operation of simultaneous vacuum evaporation and agitation was continued until the moisture content of the residue was reduced to about 35%. The material was then removed from the mixer. The following is a partial analysis of the material as removed:

| | Per cent |
|---|---|
| $Ca(OCl)_2$ | 57.2 |
| $Ca(OH)_2$ | 5.6 |
| $CaCO_3$ | .7 |
| $CaCl_2$ | 1.3 |
| $H_2O$ | 35.2 |

The material thereafter was dried in a vacuum shelf dryer as in Example I and after drying gave the following screen analysis:

| Mesh | Per cent retained |
|---|---|
| +20 | 22.5 |
| +28 | 14.2 |
| +35 | 16.2 |
| +48 | 14.7 |
| +65 | 10.6 |
| +100 | 7.6 |
| +200 | 8.1 |
| +270 | 3.0 |
| +325 | .8 |
| +400 | .8 |
| −400 | 1.5 |

*Example III*

In this case, as in Example II, the calcium hypochlorite was formed in the laboratory mixer by adding 8.7 lbs. of butyl hypochlorite to a slurry consisting of 7.4 lbs. of water and 3.7 lbs. of hydrated lime. When hydrolysis was substantially complete, vacuum and heat were applied and the mixture was agitated while alcohol and water were driven off to give a residue containing about 30% moisture. This residue was granular in character and as removed from the dryer had the following partial analysis:

| | Per cent |
|---|---|
| $Ca(OCl)_2$ | 58.9 |
| $Ca(OH)_2$ | 7.6 |
| $CaCO_3$ | 1.6 |
| $CaCl_2$ | 1.2 |
| $H_2O$ | 30.7 |

This material was subjected to further drying in a vacuum shelf dryer as described in Example I and yielded a satisfactory granular product.

*Example IV*

In this instance, the starting material was a fine dry, dusty, powder having the following analysis:

| | Per cent |
|---|---|
| $Ca(OCl)_2$ | 73.7 |
| $Ca(ClO_3)_2$ | .6 |
| $CaCO_3$ | 3.0 |
| $Ca(OH)_2$ | 14.0 |
| $CaCl_2$ | 7.6 |
| $H_2O$ | 1.2 |

This dry powder was mixed with water in the ratio of 13.2 lbs. of powder to 7.8 lbs. of water. Again the equipment was a horizontal double shaft sigma blade type mixer and the mixing was continued at atmospheric temperatures and pressures until a fairly uniform plastic mass was obtained. Thereafter, the mixer was closed, vacuum was applied and hot water was circulated through the jacket of the mixer. Under these conditions, drying and agitation were continued until the moisture content was reduced to about 32%, after which the resulting granular product was discharged from the mixer. As discharged from the mixer, the product had the following analysis:

| | Per cent |
|---|---|
| $Ca(OCl)_2$ | 50.56 |
| $Ca(ClO_3)_2$ | .42 |
| $CaCO_3$ | 2.08 |
| $Ca(OH)_2$ | 9.74 |
| $CaCl_2$ | 5.20 |
| $H_2O$ | 32.00 |

This partially dried product from the mixer was dried further without substantial agitation in a vacuum shelf dryer until it contained about 2% moisture. It was then crushed and screened. A rough screen analysis of the final material was as follows:

| | Per cent |
|---|---|
| −14+65 mesh | 87.5 |
| −65 mesh | 12.5 |

The invention may be employed to produce a granular product from almost any type of calcium hypochlorite starting material. The drying may be conducted with a minimum of decomposition and the product does not stick to the dryer surfaces in the final stages of drying. Moreover, the drying operations are dustless and the heretofore customary dust nuisance (particularly during removal of the product from the dryer) is substantially eliminated. During the first stage of drying, valuable solvents, such as tertiary alcohols, may be recovered economically.

I claim:

1. In the drying of a calcium hypochlorite product, the improvement which comprises subjecting a plastic slurry of calcium hypochlorite simultaneously to evaporation and agitation until the unevaporated portion of the slurry forms a plurality of loosely bonded aggregates, continuing the evaporation and the agitation until the aggregates break down into a granular product and discontinuing the agitation while the granular product still contains moisture in proportions ranging from about 25% to about 35% by weight.

2. In the drying of a calcium hypochlorite product, the improvement which comprises subjecting a plastic slurry of calcium hypochlorite simultaneously to evaporation and agitation until the unevaporated portion of the slurry forms a granular product containing moisture in proportion ranging from about 25% to about 35% by weight, discontinuing the agitation and drying the granular product in a relatively quiescent condition.

3. In the drying of a calcium hypochlorite product, the improvement which comprises subjecting a plastic slurry of calcium hypochlorite simultaneously to evaporation and agitation until the unevaporated portion of the slurry forms a granular product containing moisture in proportion ranging from about 25% to about 35% by weight, discontinuing the agitation and drying the granular product in a relatively quiescent condition until the moisture contained in the product is less than about 2% by weight.

4. In the treatment of a relatively dry mass of calcium hypochlorite, the improvement which comprises adding liquid to said mass until a plastic slurry is formed, subjecting the plastic slurry simultaneously to evaporation and agitation until the unevaporated portion of the slurry has a moisture content ranging from about 25% to about 35% by weight and the portion has become granular in character, discontinuing the agitation and drying the resulting granular product in a relatively quiescent condition until the moisture content is reduced to at most 2%.

5. In the drying of a calcium hypochlorite product, the improvement which comprises removing liquid from a fluent mass containing calcium hypochlorite until the mass becomes a plastic slurry, subjecting the plastic slurry simultaneously to evaporation and agitation until the moisture content of the unevaporated portion of the slurry is reduced to within the range of from about 25% to about 35% by weight so that the unevaporated portion first forms a plurality of loosely bonded aggregates which become smaller with continued evaporation and agitation, discontinuing the agitation and thereafter subjecting the aggregates to further drying while maintaining said aggregates in a relatively quiescent condition.

6. In the drying of a calcium hypochlorite product, the improvement which comprises subjecting a plastic slurry of calcium hypochlorite simultaneously to vacuum evaporation and agitation until the unevaporated portion of the slurry forms a plurality of small ball-like aggregates, continuing the simultaneous evaporation and agitation until the aggregates break down into a granular product that still contains moisture in proportions ranging from about 25% to about 35% by weight, discontinuing the agitation and removing substantially all of the remaining moisture from the granular product by evaporation while maintaining the granular product in a relatively quiescent condition.

GEORGE GERALD DAY.